(12) United States Patent
Suh et al.

(10) Patent No.: US 9,049,430 B2
(45) Date of Patent: Jun. 2, 2015

(54) BROADCAST RECEIVER AND 3D VIDEO DATA PROCESSING METHOD THEREOF

(75) Inventors: Jong Yeul Suh, Seoul (KR); Jeong Hyu Yang, Seoul (KR); Jin Pil Kim, Seoul (KR); Kwan Suk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 527 days.

(21) Appl. No.: 13/501,654

(22) PCT Filed: Mar. 19, 2010

(86) PCT No.: PCT/KR2010/001704
§ 371 (c)(1),
(2), (4) Date: Apr. 12, 2012

(87) PCT Pub. No.: WO2011/046271
PCT Pub. Date: Apr. 21, 2011

(65) Prior Publication Data
US 2012/0200666 A1    Aug. 9, 2012

Related U.S. Application Data

(60) Provisional application No. 61/251,273, filed on Oct. 13, 2009.

(51) Int. Cl.
*H04N 13/00* (2006.01)
*H04N 13/04* (2006.01)
*H04N 21/2362* (2011.01)
*H04N 21/434* (2011.01)
*H04N 21/81* (2011.01)

(52) U.S. Cl.
CPC ....... *H04N 13/0059* (2013.01); *H04N 13/0029* (2013.01); *H04N 13/0048* (2013.01);
(Continued)

(58) Field of Classification Search
CPC ............ H04N 13/0048; H04N 13/005; H04N 13/0059; H04N 21/816; H04N 21/2362; H04N 21/4347
See application file for complete search history.

(56) References Cited

U.S. PATENT DOCUMENTS 6,055,012 A    4/2000   Haskell et al.
6,057,884 A    5/2000   Chen et al.
(Continued)

FOREIGN PATENT DOCUMENTS

EP        1739979 A2      6/2006
JP      2005006114 A      1/2005
(Continued)

OTHER PUBLICATIONS

TDVISION Systems Inc. "TVD CODEC—Enabling 3D HD video for massive adoption providing 2D compatibility", Nov. 2008.

*Primary Examiner* — Huy T Nguyen
(74) *Attorney, Agent, or Firm* — McKenna Long & Aldridge LLP

(57) ABSTRACT

A broadcast receiver and a 3D video data processing method are disclosed. The method includes receiving a broadcast signal including system information and video data, parsing system information of a program, and determining whether the program provides a 3D broadcast service from the system information, extracting, if the program provides a 3D broadcast service, broadcast data of the program, and processing video data of broadcast data according to the system information. The broadcast receiver includes a receiving unit receiving a broadcast signal including system information and video data, an SI processor parsing system information of a program, and determining whether the program provides a 3D broadcast service from the system information, a demultiplexer extracting, if the program provides a 3D broadcast service, broadcast data of the program, and a video processor processing video data of the broadcast data according to system information.

14 Claims, 11 Drawing Sheets

(52) U.S. Cl.
CPC ....... *H04N13/0066* (2013.01); *H04N 13/0454* (2013.01); *H04N 21/2362* (2013.01); *H04N 21/4345* (2013.01); *H04N 21/816* (2013.01)

(56) References Cited

U.S. PATENT DOCUMENTS

| 7,086,076 | B1 | 8/2006 | Park | |
|---|---|---|---|---|
| 2006/0285011 | A1* | 12/2006 | Yun | 348/465 |
| 2007/0002041 | A1* | 1/2007 | Kim et al. | 345/419 |
| 2008/0089412 | A1 | 4/2008 | Ugur et al. | |
| 2009/0257452 | A1* | 10/2009 | Lee et al. | 370/476 |
| 2009/0309899 | A1* | 12/2009 | Tytgat | 345/650 |

FOREIGN PATENT DOCUMENTS

| KR | 20080099109 A | 11/2008 |
|---|---|---|
| WO | 2007066868 A1 | 6/2007 |
| WO | 2010076933 A1 | 7/2010 |

* cited by examiner

Fig. 3

| Syntax | No. of Bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i< N; i++) { | | |
|         descriptor() | | |
|     } | | |
|     for (i=0; i< N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i< N2; i++) { | | |
|             descriptor() | | |
|         } | | |
|     } | | |
|     CRC_32 | 32 | rpchof |
| } | | |

| Syntax | No. of bits | Format |
|---|---|---|
| 3DTV_descriptor ( ) { | | |
| descriptor_tag | 8 | 0xTBD |
| descriptor_length | 8 | uimsbf |
| corresponding_2D_program_number | 16 | uimsbf |
| number_of_total_views | 8 | uimsbf |
| } | | |

Fig. 5

| Syntax | No. of bits | Format |
|---|---|---|
| 3DTV_ES_descriptor ( ) { | | |
| descriptor_tag | 8 | 0xTBD |
| descriptor_length | 8 | uimsbf |
| 3D_ES_stream_type | 8 | uimsbf |
| if (3D_ES_stream_type =='video') { | | |
| reserved | 6 | uimsbf |
| base_video_flag | 1 | bslbf |
| left_right_flag | 1 | bslbf |
| } | | |
| } | | |

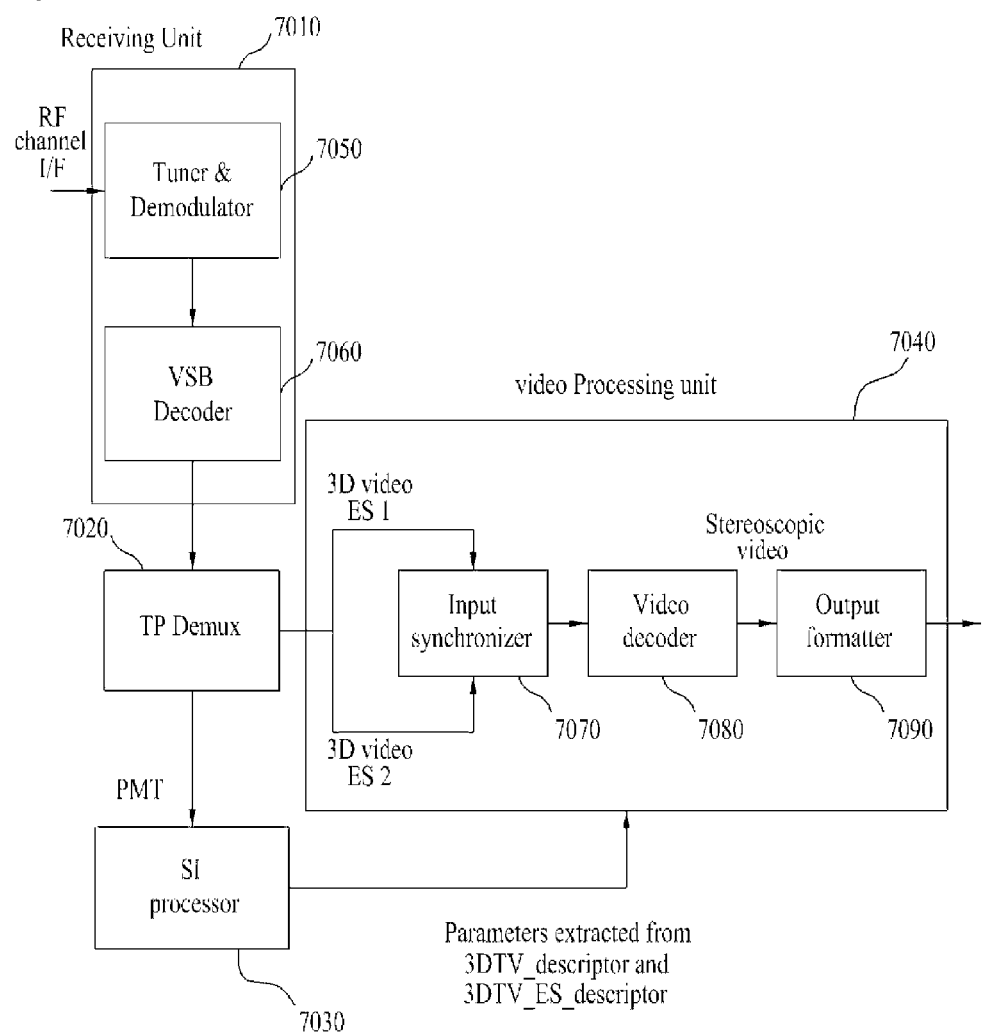

Fig. 8

| Syntax | No. of Bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i< N; i++) { | | |
|         descriptor() | | |
|     } | | |
|     for (i=0; i< N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i< N2; i++) { | | |
|             descriptor() | | |
|         } | | |
|     } | | |
|     CRC_32 | 32 | rpchof |
| } | | |

8010 → program_info_length
8020 → descriptor()
8030 → stream_type

Fig. 9

| Syntax | No. of bits | Format |
|---|---|---|
| 3DTV_descriptor ( ) { | | |
|     descriptor_tag | 8 | 0xTBD |
|     descriptor_length | 8 | uimsbf |
|     corresponding_2D_program_number | 16 | uimsbf |
| } | | |

Fig. 10

| Syntax | No. of bits | Format |
|---|---|---|
| 3DTV_format_descriptor ( ) { | | |
|     descriptor_tag | 8 | 0xTBD |
|     descriptor_length | 8 | uimsbf |
|     3D_ES_stream_type | 8 | uimsbf |
|     composition_type | 8 | uimsbf |
|     reserved | 4 | '11111' |
|     LR_first_flag | 1 | bslbf |
|     spatial_flipping_flag | 1 | bslbf |
|     image0_flipped_flag | 1 | bslbf |
|     quincunx_filtering_flag | 1 | bslbf |
| } | | |

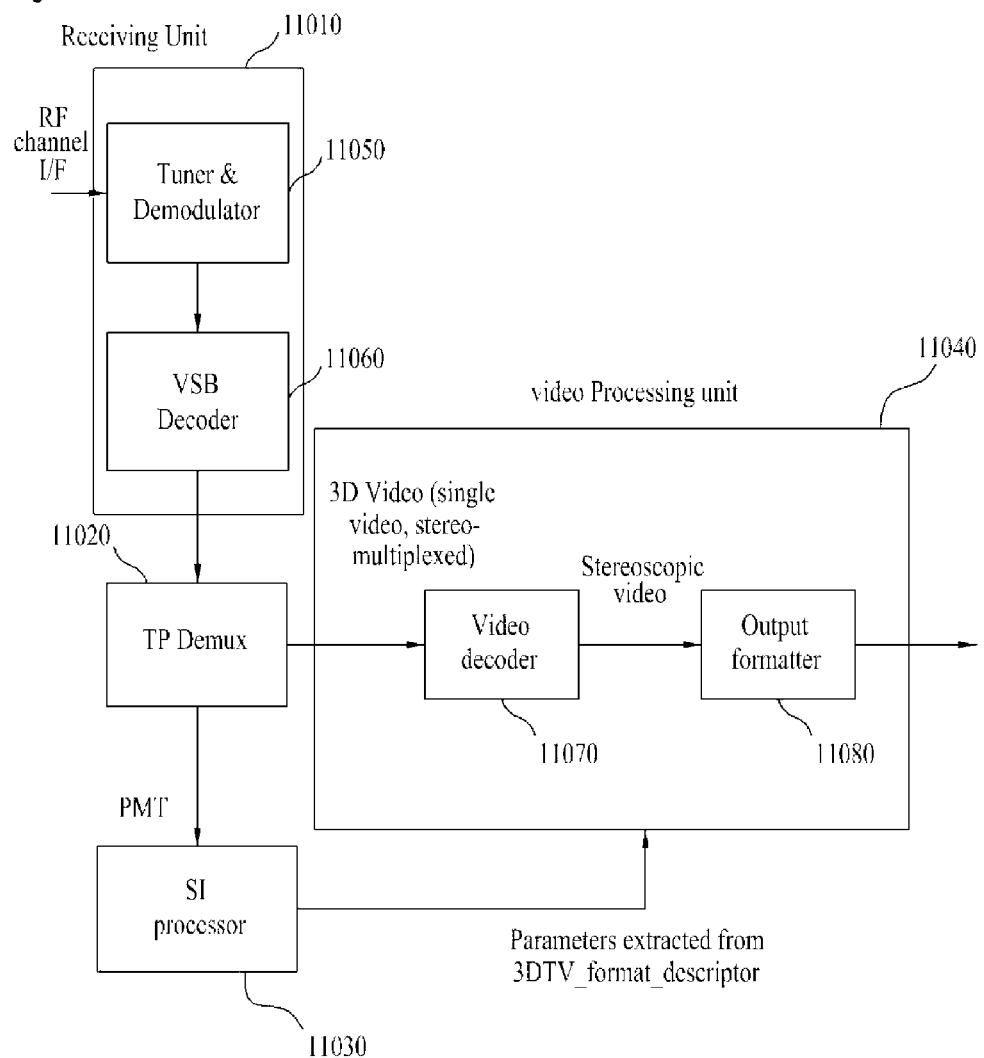

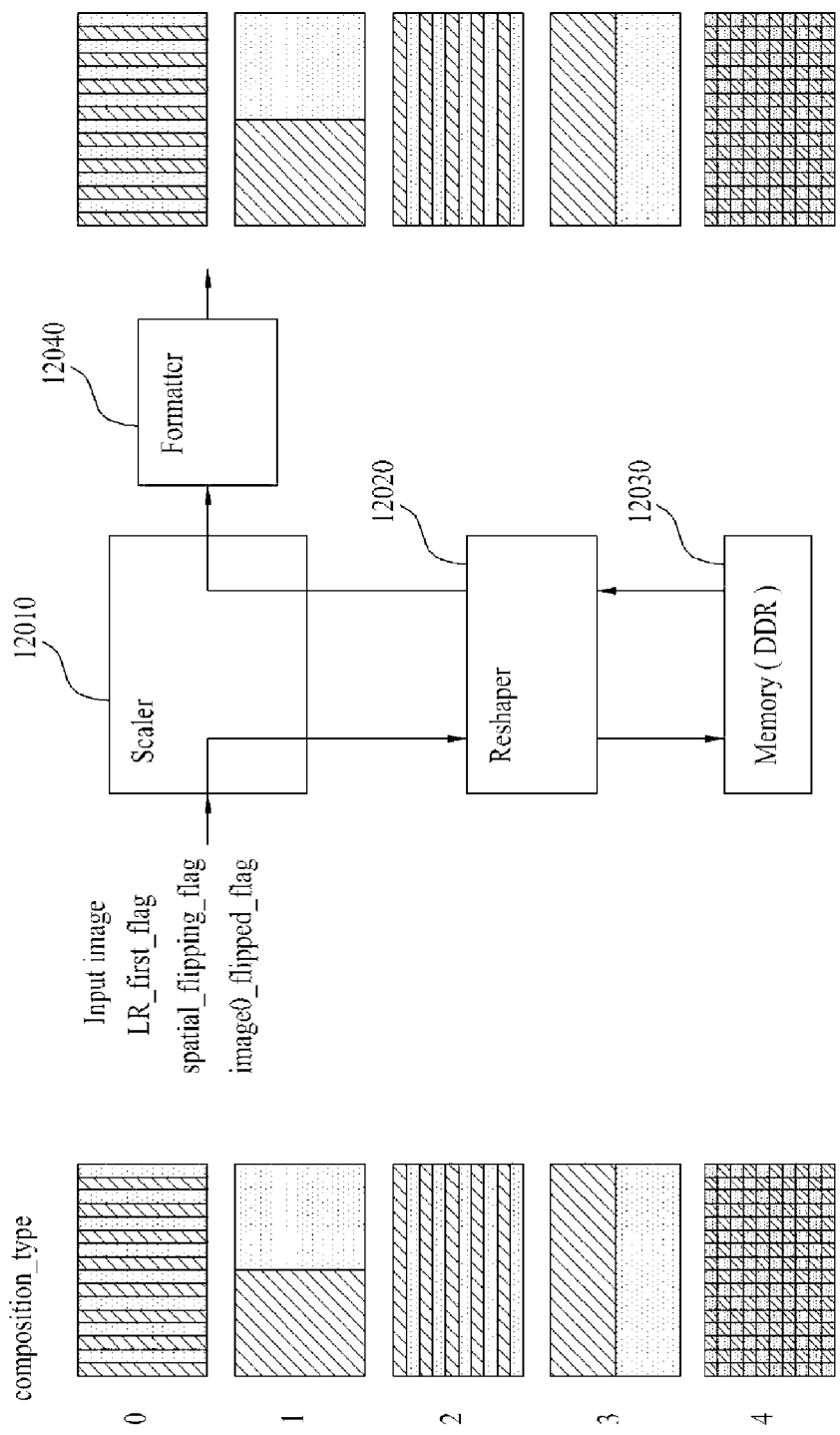

Fig. 13
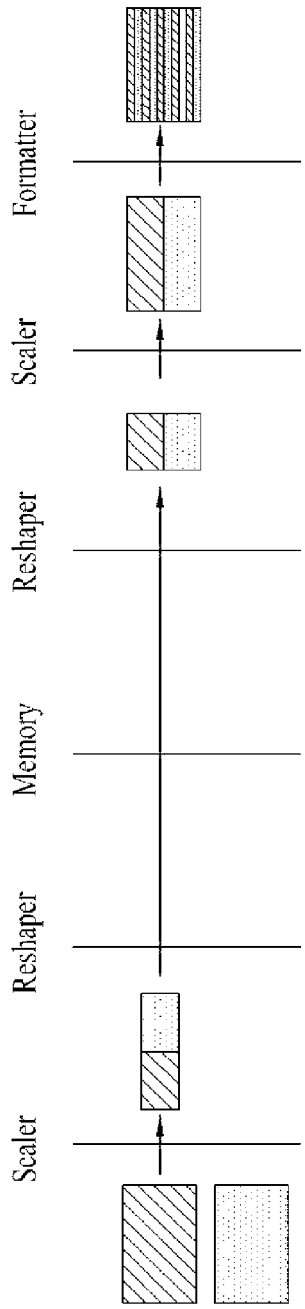
1) In first embodiment, output format is horizontally interleaving case
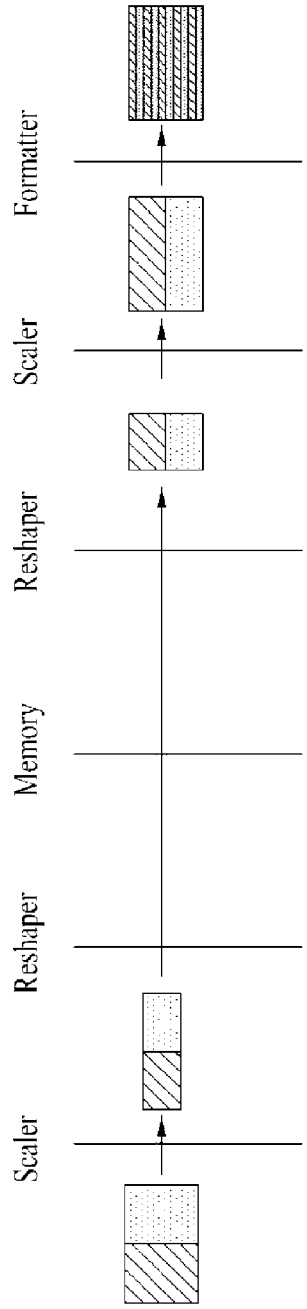
2) In second embodiment, input image is side-by-side, left first, no flipping, and output format is horizontally interleaving case

US 9,049,430 B2

BROADCAST RECEIVER AND 3D VIDEO DATA PROCESSING METHOD THEREOF

This application claims the benefit of priority of U.S. Provisional Application No. 61/251,273 filed on Oct. 13, 2009 and PCT Application No. PCT/KR2010/001704 filed on Mar. 19, 2010, all of which are incorporated by reference in their entirety herein.

TECHNICAL FIELD

The present invention relates to an apparatus and method for processing a broadcast signal, and more particularly to a broadcast receiver for processing video data using signaling information of a 3D broadcast service when a 3D broadcast system provides the 3D broadcast service, and a 3D video data processing method thereof.

BACKGROUND ART

Generally, a three dimensional (3D) image (or a stereoscopic image) provides a user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

DISCLOSURE OF INVENTION

Technical Problem

Accordingly, the present invention is directed to a broadcast receiver and a 3D video data processing method, that substantially obviate one or more problems due to limitations and disadvantages of the related art.

An object of the present invention is to provide a broadcast receiver, and a 3D video data processing method, which transmit and receive 3D video data when a 3D broadcast system transmits a video stream for stereoscopic display, and process the 3D video data using the broadcast receiver, and thus providing a user with more effective and convenient broadcast environments.

Solution to Problem

The object of the present invention can be achieved by providing a three dimensional (3D) broadcast data processing method for use in a broadcast receiver, the method including receiving a broadcast signal including system information and video data, parsing system information of a program, and determining whether the program provides a 3D broadcast service on the basis of the system information, extracting, if the program provides a 3D broadcast service, broadcast data corresponding to the program, and processing video data contained in the broadcast data according to the system information.

In another aspect of the present invention, provided herein is a broadcast receiver including a receiving unit for receiving a broadcast signal including system information and video data, a system information (SI) processor for parsing system information of a program, and determining whether the program provides a 3D broadcast service on the basis of the system information, a demultiplexer for extracting, if the program provides a 3D broadcast service, broadcast data corresponding to the program, and a video processing unit for processing video data contained in the broadcast data according to the system information.

Advantageous Effects of Invention

According to embodiments of the present invention, the broadcast receiver can process 3D video data such that a 3D effect intended by a 3D broadcast service provider is reflected in the 3D broadcast service.

In addition, the embodiments of the present invention can effectively provide a 3D broadcast service simultaneously while minimizing the effect on a conventional 2D broadcast service.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 3 shows a syntax structure of a Program Map Table (PMT) including 3D broadcast information according to one embodiment of the present invention.

FIG. 4 shows a syntax structure of 3DTV information contained in a PMT according to one embodiment of the present invention.

FIG. 5 shows a syntax structure of 3DTV Elementary Stream (ES) information contained in a PMT according to a first embodiment of the present invention.

FIG. 7 is a block diagram illustrating another example of a broadcast receiver for processing a broadcast signal according to a first embodiment of the present invention.

FIG. 8 shows a syntax structure of a PMT including 3D broadcast information according to one embodiment of the present invention.

FIG. 9 shows a syntax structure of 3DTV information contained in a PMT according to one embodiment of the present invention.

FIG. 10 shows a syntax structure of 3D format information contained in a PMT according to one embodiment of the present invention.

FIG. 11 is a block diagram illustrating a broadcast receiver for processing a broadcast signal according to a second embodiment of the present invention.

FIG. 12 is a structural diagram illustrating a broadcast receiver that converts a multiplexing format of a received image into another format using 3D image format information and outputs the converted result according to one embodiment of the present invention.

FIG. 13 is a conceptual diagram illustrating a video data processing method of a broadcast receiver that converts a multiplexing format of a received image using 3DTV format information and outputs the converted result according to one embodiment of the present invention.

BEST MODE FOR CARRYING OUT THE INVENTION

Figure 1:
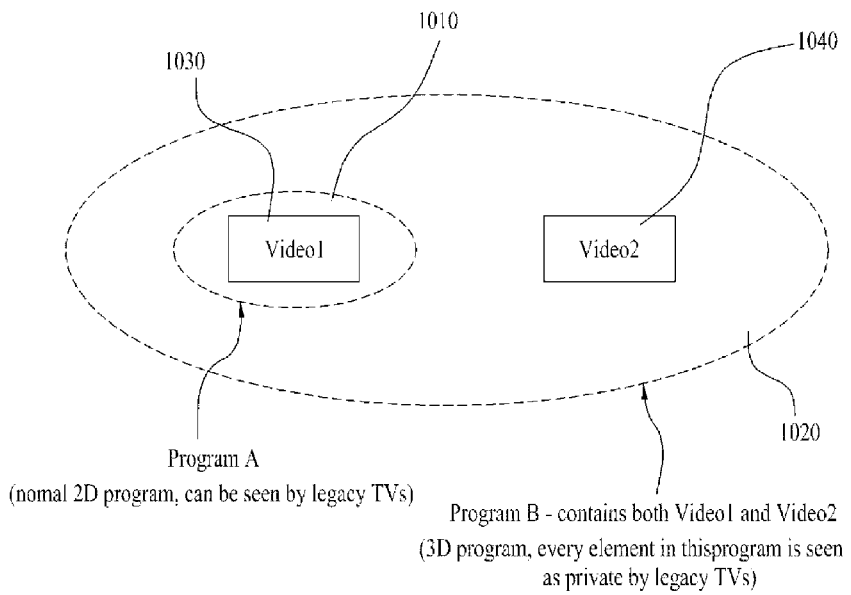
FIG. 1 is a conceptual diagram illustrating a method for providing a 3D broadcast service according to a program number allocation according to a first embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

The 3D image display method includes a stereoscopic imaging scheme in which two viewpoints are considered and a multi-view imaging scheme in which three or more viewpoints are considered. In contrast, a single view image scheme shown in the related art may also be referred to as a monoscopic image scheme.

The stereoscopic imaging scheme is designed to use one pair of right and left view images acquired when a left-side camera and a right-side camera spaced apart from each other by a predetermined distance capture the same target object. The multi-view imaging scheme uses three or more images captured by three or more cameras spaced apart by a predetermined distance or angle. Although the following description discloses embodiments of the present invention using the stereoscopic imaging scheme as an example, the inventive concept of the present invention may also be applied to the multi-view imaging scheme. For convenience of description and better understanding of the present invention, the term 'stereoscopic' may also be referred to as 'stereo' as necessary.

A stereoscopic image or multi-view image may be compressed and coded according to a variety of methods including a Moving Picture Experts Group (MPEG) scheme, and transmitted to a destination.

For example, a stereoscopic image or a multi-view image may be compressed and coded according to the H.264 /Advanced Video Coding (AVC) scheme, and transmitted. In this case, the reception system may decode a received image in reverse order of the H.264/AC coding scheme, such that it is able to obtain the 3D image.

In addition, one of a left view image and a right view image of a stereoscopic image or one of multiple-view images may be assigned to an image of a base layer, and the remaining one may be assigned to an image of an extended layer. The base layer image may be encoded using the same method as the monoscopic imaging method. In association with the extended layer image, only information of the relationship between the base layer image and the extended layer image may be encoded and transmitted. As an exemplary compression coding scheme for the base layer image, a JPEG, an MPEG-2, an MPEG-4, or a H.264/AVC scheme may be used. For convenience of description, the H.264/AVC scheme may be exemplarily used in one embodiment of the present invention. In one embodiment of the present invention, the compression coding scheme for an image of an upper or higher layer may be set to the H.264/Multi-view Video Coding (MVC) scheme.

A conventional terrestrial DTV transmission/reception standard is based on 2D video content. Therefore, in order to provide 3D TV broadcast content, a transmission/reception standard for 3D video content must be additionally defined. The broadcast receiver receives a broadcast signal according to the added transmission/reception standard, and properly processes the received broadcast signal, such that it can support the 3D broadcast service. In addition, when a 3D broadcast service is provided, the broadcast receiver receives a 2D broadcast service and a 2D broadcast service, such that it has to consider backward compatibility with a legacy device.

A conventional DTV transmission/reception standard according to embodiments of the present invention will hereinafter be described using an Advanced Television Systems Committee (ATSC) standard as an example.

The ATSC system includes specific information for processing broadcast content in system information, and transmits the resultant system information including the specific information. For example, the system information may be called service information. The system information includes channel information, program information, event information and the like. The ATSC standard includes the aforementioned system information in a Program Specific Information/Program and System Information Protocol (PSI/PSIP), and can transmit and receive the resultant PSI/PSIP including the system information. However, the scope and spirit of the present invention are not limited to the above-mentioned examples. If it is assumed that there is a protocol capable of transmitting the system information in a table format, the scope and spirit of the present invention can also be applied to other examples irrespective of titles of the system information.

The PSI is disclosed only for illustrative purposes and better understanding of the present invention. The PSI may include a Program Association Table (PAT), a Program Map Table (PMT), and the like The PAT corresponds to specific information which is transmitted by a packet having a PID of '0'. The PMT transmits a program identification number, packet identifier (PID) information of a transport stream packet in which individual bit streams of video and audio data constituting a program are transmitted, and PID information in which a PCT is transmitted. In addition, in the case where the PMT acquired from the PAT is parsed, information regarding correlation among constituent elements of a program can be acquired.

The PSIP may include, for example, a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), a Master Guide Table (MGT), and the like.

The VCT transmits information about a virtual channel, for example, channel information for selecting a channel and information about a packet identifier (PID) for receiving audio- and/or video- data. That is, when the VCT is parsed, a channel name, a channel number, and the PID of the audio and video data of a broadcast program carried in the channel can be known. The STT transmits current date and time information, and the RRT transmits information about a region and a deliberative council for a program rating level. The ETT transmits an additional description about a channel and a broadcast program, and the EIT transmits information about an event of a virtual channel. The DCCT/DCCSCT transmits information about an automatic channel change, and the MGT transmits version- and PID- information of individual tables contained in the PSIP.

Video and audio elements contained in the broadcast signal and transmitted to a destination may be identified by a stream ID, an elementary stream (ES) ID, or the like. The above-mentioned identification scheme may be changed according to a transmission/reception protocol of a broadcast signal and a system standard such as the ATSC system.

Specific information indicating the inclusion or non-inclusion of a TVCT according to the system standard may not be mandatory. In contrast, the PMT may be mandatorily transmitted when a broadcast stream uses the MPEG2 codec scheme. In addition, in the case of using the reception system, a TVCT may not be included in the broadcast signal. If a reception interval of the TVCT is longer than a reception interval of the PMT, the reception system may identify video and audio elements from each other using the PMT. However, in this case, a conventional PMT does not have specific information indicating the inclusion or non-inclusion of the 3D broadcast service. Therefore, a signal method for signaling 3D broadcast service information using the PMT will hereinafter be described in detail.

Under the condition that a 2D broadcast service and a 3D broadcast service are simultaneously provided, if the broadcast reception system desires to maintain backward compatibility with the 2D broadcast service and at the same time to provide a 3D broadcast service, the broadcast reception system is able to map a program number to each broadcast service. In particular, if the 3D broadcast service provides a stereoscopic image, the broadcast system may use a variety of program number mapping schemes according to a method for constructing and transmitting a stereoscopic image. 2D-scheme content corresponding to content via which the 3D broadcast service is provided may be provided. In this case, a program number is allocated to each of 2D content and 3D content corresponding to the same content, such that video and audio elements can be identified from each other.

FIG. 1 is a conceptual diagram illustrating a method for providing a 3D broadcast service according to a program number allocation according to a first embodiment of the present invention.

Referring to FIG. 1, 2D video content is mapped to a program A 1010, and 3D video content is mapped to a program B 1020. The program A 1010 includes a video element 1030 for providing 2D video content. The program B 1020 includes a base-view video element 1030 and an extended-view video element 1040 so as to provide 3D video content.

A legacy broadcast receiver identifies the program A, and can process video data corresponding to the video element 1030. In the case of the program B, all elements contained in the program B may not be identified by the legacy broadcast receiver, or an ID or type to be ignored is allocated to each element, so that the legacy broadcast receiver can process only the program A.

The 3D broad receiver can identify not only elements corresponding to the program A but also elements corresponding to the program B. Accordingly, the 3D broadcast receiver may process both the 2D content (Program A) and the 3D content (Program B), and provide the processed 2D and 3D contents.

In FIG. 1, audio element is not shown. Needless to say, the audio element can be equally provided to the 2D content and the 3D content, such that it may be contained in the program A. As shown in FIG. 1, it is not necessary for the audio element to be allocated a program number according to the provision of 3D broadcast service. However, in order to prevent the faulty operation of the legacy broadcast receiver, the audio element is contained in each element of the program B corresponding to the 3D broadcast service, such that the audio element may be discarded or bypassed.

Figure 2:
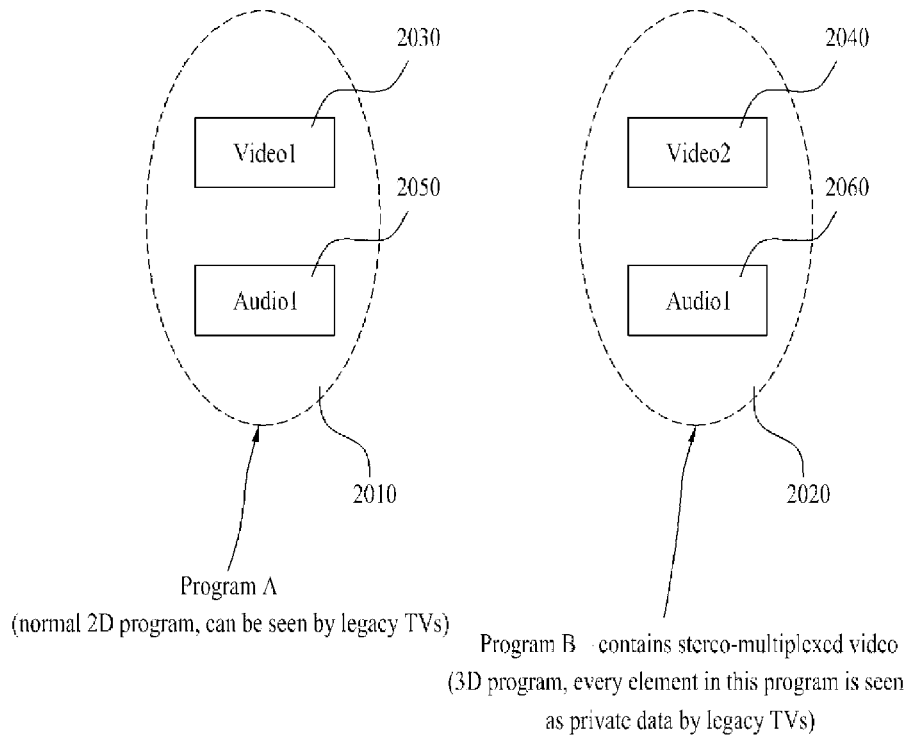
FIG. 2 is a conceptual diagram illustrating a method for providing a 3D broadcast service according to a program number allocation according to a second embodiment of the present invention.

FIG. 2 is a conceptual diagram illustrating a method for providing a 3D broadcast service according to a program number allocation according to a second embodiment of the present invention.

In FIG. 2, 2D video content is mapped to the program A 2010, and 3D video content is mapped to the program B 2020. The program A 1010 includes video elements 2030 and audio elements 2050 to provide 2D video content. The program B 2020 includes a video element 2040 and an audio element 2060 to provide 3D video content.

In FIG. 2, the video element 2040 of the 3D video content 2020 includes all video elements required for providing 3D content in a different way from FIG. 1. In other words, the video element 2040 acting as a single video element is classified into a left view image and a right view image that are required for providing a stereoscopic image. Each of the left view image and the right view image has a half resolution, such that the left view image and the right view image are multiplexed into one frame, and the multiplexed result is transmitted to a destination.

The legacy broadcast receiver identifies the program A, and processes data corresponding to the video element 2030 and data corresponding to the audio element 2050. In the case of the program B, all elements contained in the program B may not be identified in the legacy broadcast receiver, or an ID or type to be ignored is allocated to the legacy broadcast receiver, such that the legacy broadcast receiver can process only the program A.

The 3D broadcast receiver can identify not only elements corresponding to the program A but also elements corresponding to the program B. In the case of providing 2D content, the 3D broadcast receiver processes elements corresponding to the program A 2010 and provides the processed result. In the case of providing 3D content, the 3D broadcast receiver processes elements corresponding to the program B 2020 and provides the processed result.

A method for constructing the PMT, a broadcast receiver, and operations of the broadcast receiver according to first and second embodiments of the present invention will hereinafter be described in detail.

First, a PMT structure, a broadcast receiver structure, and operations of the broadcast receiver according to the first embodiment of the present invention will hereinafter be described in detail.

FIG. 3 shows a syntax structure of a Program Map Table (PMT) including 3D broadcast information according to one embodiment of the present invention.

In FIG. 3, the PMT includes 3DTV information, a stream type, and 3DTV ES information, that are used as 3D broadcast information, as a descriptor or a field type. Detailed description of fields contained in the PMT is as follows.

A 'table_id' field is an 8-bit field which shall always be set to '0x02' in a 'TS_program_map_section' field.

A 'section_syntax_indicator' field is a 1-bit field which shall be set to '1'.

A 'section_length' field is a 12-bit field in which first two bits shall be set to '00', and specifies the number of bytes of the section starting immediately the 'section_length' field, and including the CRC.

A 'program_number' field is a 16-bit field, which specifies the program to which the 'program_map_PID' field is applicable.

A 'version_number' field is a 5-bit field, which indicates the version number of the 'TS_program_map_section' field.

A 'current_next_indicator' field is a 1-bit field. When a bit of the 'current_next_indicator' field is set to '1', this means that the transmitted 'TS_program_map_section' field is currently applicable. When a bit of the 'current_next_indicator' field is set to '0', this means that the transmitted 'TS_program_map_section' field is not yet applicable and shall be the next 'TS_program_map_section' field to become valid.

A 'section_number' field includes a value of an 8-bit field which shall be '0x00'.

A 'last_section_number' field includes a value of an 8-bit field which shall be '0x00'.

A 'PCR_PID' field is a 13-bit field indicating the PID of the Transport Stream (TS) packets which shall contain the PCR fields valid for the program specified by a 'program_number' field. In the case where no PCR is associated with a program definition for private streams, then this field shall take the value of '0x1FFF'.

A 'program_info_length' field is a 12-bit field, the first two bits of which shall be '00'. The 'program_info_length' field specifies the number of bytes of descriptors immediately following the 'program_info_length' field.

3DTV information (or 3DTV_descriptor) is contained in the descriptor field 3010, and the 3DTV information will hereinafter be described in detail.

A 'stream_type' field is an 8-bit field specifying the type of elementary stream or payload carried within packets with the PID whose value is specified by the 'elementary_PID' field. A 'stream_type' field may indicate a coding type of a corresponding video stream. As an exemplary coding type, a JPEG, an MPEG-2, an MPEG-4, an H.264/AVC, or an H.264/AVC scheme may be used. In addition, the stream_type field 3020 may have a specific field value that is interpreted as private data in the 2D broadcast receiver. For example, in regard to a video stream or an audio stream contained in a 3D corresponding program, a field value of a stream_type field 3020 is set to 0x06, such that the legacy 2D broadcast receiver may discard or bypass corresponding streams.

An 'elementary_PID' field is a 13-bit field specifying a PID of the Transport Stream (TS) packets which carry the associated elementary stream or payload. This PID may be used as a PID of primary video data or secondary video data.

An 'ES_info_length' field is a 12-bit field, the first two bits of which shall be '00'. The 'ES_info_length' field may specify the number of bytes of descriptors of the associated elementary stream immediately following the 'ES_info_length' field.

3DTV ES information (or 3DTV_ES_descriptor) may be contained in the descriptor field 3030, and the 3DTV ES information will hereinafter be described in detail.

A 'CRC_32' field is a 32-bit field which contains a CRC value that gives a zero output of registers in the decoder defined in Annex B after processing the entire Transport Stream program map section.

FIG. 4 shows a syntax structure of 3DTV information contained in a PMT according to one embodiment of the present invention.

Detailed description of fields shown in FIG. 4 is as follows, and the fields shown in FIG. 4 may be contained in the descriptor 3010 of FIG. 3.

A 'corresponding_2D_program_number' field may indicate a program number corresponding to 2D content of a 3D program. If a user who views a program in a 3D mode changes a current viewing mode indicating the 3D mode to the 2D mode, a program number shown in the 'corresponding_2D_program_number' field is used. For example, if there is no 2D program, the 'corresponding_2D_program_number' field may be set to 0x0000.

'number_of_total_views' field may indicate the number of viewpoints of an image that is contained in corresponding 3D content and provided.

FIG. 5 shows a syntax structure of 3DTV Elementary Stream (ES) information contained in a PMT according to a first embodiment of the present invention.

Description of fields contained in the 3DTV ES information is as follows, and fields shown in FIG. 5 may be contained in the descriptor 3030 of FIG. 3.

A 3D_ES_stream_type field may indicate category- and codec- information of the video ES contained in a corresponding 3D video service. For example, a specific value defined in Table 2-34 of ISO/IEC 13818-1 (MPEG-2 Systems) may be used.

'3D_ES_stream_type=video' means that a 3D_ES_stream_type value contained in the 3DTV_ES_descriptor corresponds to a video ES, such as 0x02 (MPEG-2 video), 0x1B (AVC/H.264), or 0x20 (MVC). In other words, the base_video_flag field or the left_right_flag field may be absent or discarded when a corresponding ES is an audio ES.

The base_video_flag field indicates whether or not a corresponding video element is a base video (i.e., a base-view video). If a user who views a 3D program using the 3D broadcast receiver changes a current 3D mode to a 2D mode, the broadcast system according to the present invention can switch a current program to another program using the 'corresponding 2D_program_number' field. Alternatively, the broadcast system may process only the video ES having the base_video_flag_field of '1', and then display the processed result. The number of streams, each of which has the 'base_video_flag' field of '1', from among several video ESs constructing the 3D program needs to be set to 1. In other words, only one stream from among several video ESs contained in the same program number may be set to a base video element.

A 'left_right_flag' field indicates whether or not a corresponding video element is a left image or a right image. For example, if it is determined that the corresponding video element is the left image, the 'left_right_flag' field may be set to 0. In contrast, if the corresponding video element is the right image, the 'left_right_flag' field may be set to 1. For convenience of description and better understanding of the present invention, the embodiment of the present invention discloses a 3D broadcast service based on a stereoscopic image format as an example. However, if required, a multiview stream having several viewpoints may be extended to indicate camera location information and viewpoint information of each stream in a two-dimensional camera arrangement using 'horizontal_position_id' or 'vertical_position_id' information using the 'left_right_flag' field.

If a broadcast receiver receives the PMT shown in the first embodiment, operations of the broadcast receiver can be carried out as follows.

(1) Operations of 2D Broadcast Receiver

The 2D broadcast receiver extracts a PMT from SI information contained in a broadcast signal, and parses the extracted PMT. In this case, the stream_type information contained in the PMT is checked. If the stream type information is set to 0x06, the broadcast receiver determines a corresponding stream to be private data, the corresponding stream is considered to be a service incapable of being processed in the 2D broadcast receiver, so that the corresponding program is ignored or discarded. All ESs constructing the 3D program are interpreted as private data, such that the 2D broadcast receiver ignores a corresponding program and prevents the occurrence of programs (e.g., an image in which a left view image and a right view image are mixed is output, or only audio streams are output on the condition that video data is ignored or discarded) caused by faulty operations generated when elements of the 3D program are processed.

(2) Operations of 3D Broadcast Receiver—Viewing of 3D Broadcast Service

The 3D broadcast receiver extracts a PMT from SI information contained in a broadcast signal, and parses the extracted PMT. The 3D broadcast receiver checks the stream_type information of each ES constructing the program. If the stream_type information is set to 0x06 and 3DTV information is present in the PMT, or if 3DTV ES information is present in each ES loop, it is determined that the corresponding program corresponds to a 3DTV service. In this case, the stream type field of each ES constructing the 3D program should be set to 0x06. This stream_type field of 0x06 is applied not only to a video ES and an audio ES, but also to a data broadcast stream associated with a corresponding program.

Information of a actual codec or stream type in relation to an ES constructing the corresponding program may be acquired using information of the 3D_ES_stream_type field contained in the 3DTV ES information. The broadcast receiver acquires a video PID value, and acquires left/right viewpoint information corresponding to the acquired video PID value through the 'left_right_flag' field.

The broadcast receiver combines two decoded video element streams using the output formatter, and outputs the combined result. A procedure for combining two decoded video element streams is as follows. The broadcast receiver receives left/right viewpoint video frames, converts the received left/right view video frames according to the display format. During the combining procedure, a variety of tasks, such as resizing and frame rate conversion, may be performed on video data of the completely-decoded left/right frames.

(3) Operations of 3D Broadcast Receiver—Conversion to 2D Mode

1) In the case that 3DTV information is present in PMT :

The broadcast receiver reads a 'corresponding_2D_program_number' field from 3DTV information, and recognizes a 2D program described in the 'corresponding_2D_program_number' field. Thereafter, the broadcast receiver extracts a PMT associated with a program number described in the 'corresponding_2D_program_number' field, and parses the extracted PMT, such that it acquires information of video and audio elements of a corresponding program. The broadcast receiver interworks with a VCT or the like during a process for acquiring channel information, such that it can further acquire logical channel information.

The broadcast receiver performs program switching (or channel switching), decodes video and audio elements of a 2D program corresponding to the converted program, and outputs the decoded result.

2) In case that no 3DTV information is present in PMT :

If there is no 3DTV information, the broadcast receiver is unable to immediately acquire a program number of a 2D program corresponding to a 3D program. However, the broadcast receiver provides a base-view video stream from among 3D video streams being currently provided, such that it can provide a 2D image.

Therefore, the broadcast receiver acquires a PID of a stream having a 'base_video_flag' field of '1' from among video elements configuring the 3D program. In addition, the broadcast receiver decodes only video elements corresponding to the acquired PID, and outputs a 2D program image. In this case, the broadcast receiver stops decoding the remaining video ESs.

Figure 6:
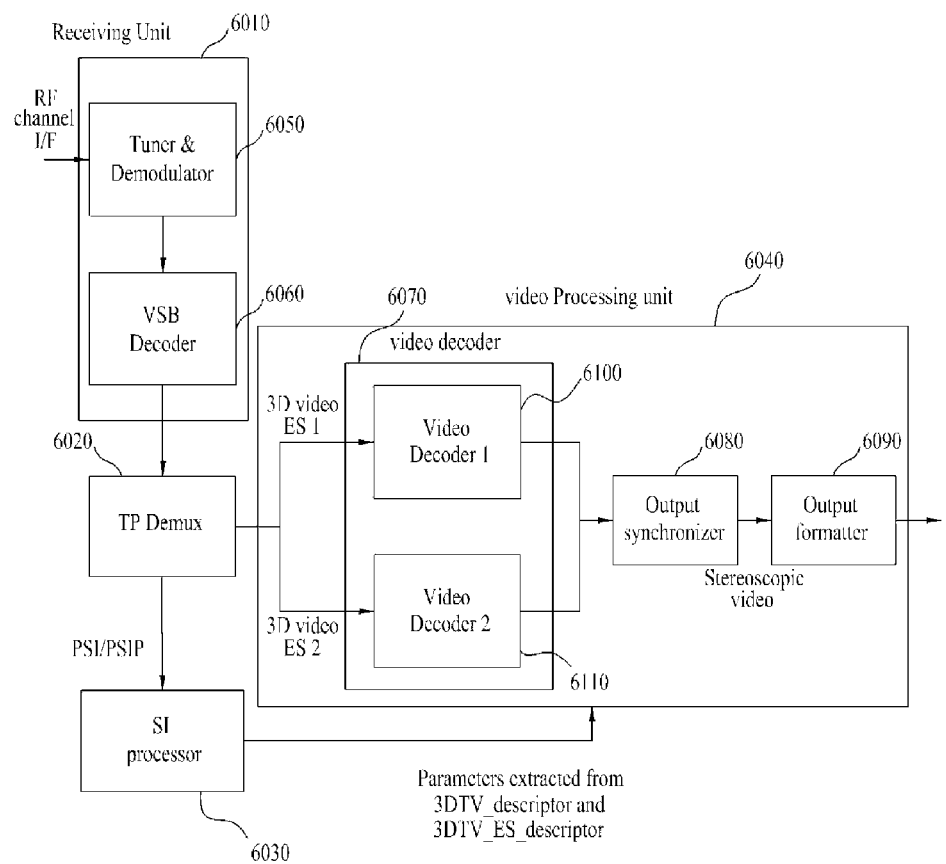
FIG. 6 is a block diagram illustrating one example of a broadcast receiver for processing a broadcast signal according to a first embodiment of the present invention.

FIG. 6 is a block diagram illustrating one example of a broadcast receiver for processing a broadcast signal according to a first embodiment of the present invention.

Referring to FIG. 6, the broadcast receiver includes a receiving unit 6010, a demultiplexer (TP Demux) 6020 for extracting a Transport Packet (TP) or Elementary Stream (ES) from the broadcast signal and outputting the extracted TP or ES, a system information (SI) processor 6030 for parsing system information, and a video processing unit 6040 for processing a video element. The receiving unit 6010 may further include a Tuner & Demodulator 6050 and a Vestigial Side Band (VSB) decoder 6060 according to embodiment categories. The video processing unit 6040 may further include a video decoder 6070 for decoding video data, an output synchronizer 6080 for synchronizing frames of video data, and an output formatter 6090 for formatting an output image. The video decoder 6070 may further include a first video decoder (Video decoder 1) 6100 and a second video decoder (Video decoder 2) 6110. In addition, although not shown in FIG. 6, the broadcast receiver may further include a controller for controlling the above-mentioned components as necessary. The controller may further perform program switching or channel switching as necessary.

In accordance with the first embodiment of the present invention, an image for a 2D broadcast service and an additional image for a 3D broadcast service may be received as an additional ES. Individual images based on a stereoscopic image format may correspond to a left view image and a right view image, respectively.

If there are two decoders (i.e., the first video decoder 6100 and the second video decoder 6110), each of which receives two video ESs as streams having different Packet Identifier (PIDs) and independently decodes each ES, a left view image and a right view image should be synchronized in units of a frame. In this case, if the output synchronizer 6080 performs the above-mentioned role, synchronizes a left view image and a right view image, and outputs the synchronized left view and right view images, the output formatter 6090 performs conversion of two images (i.e., left view and right view images) according to a display format, such that it can output the final 3D stereoscopic display signal.

FIG. 7 is a block diagram illustrating another example of a broadcast receiver for processing a broadcast signal according to a first embodiment of the present invention.

Referring to FIG. 7, the broadcast receiver includes a receiving unit 7010, a demultiplexer (TP Demux) 7020 for extracting a Transport Packet (TP) or Elementary Stream (ES) from the broadcast signal and outputting the extracted TP or ES, a system information (SI) processor 7030 for parsing system information, and a video processing unit 7040 for processing a video element. The receiving unit 7010 may further include a Tuner & Demodulator 7050 and a Vestigial Side Band (VSB) decoder 7060 according to embodiment categories. The video processing unit 7040 may further include an input synchronizer 7070 for synchronizing frames of video data, a video decoder 7080 for decoding video data, and an output formatter 7090 for formatting an output image. In addition, although not shown in FIG. 7, the broadcast receiver may further include a controller for controlling the above-mentioned components as necessary. The controller may further perform program switching or channel switching as necessary.

In FIG. 7, two video ESs are received as streams having different PIDs, and a single decoder may simultaneously decode the two video ESs. In this case, video ESs received in two paths are synchronized in units of a frame, such that the synchronized video ESs needs to be input to the video decoder. The input synchronizer 7070 performs the corresponding role. The output formatter 7090 performs image processing of the decoded left view image and the decoded right view image according to the display format, such that it can output a 3D stereoscopic display signal.

Hereinafter, a PMT structure, a broadcast receiver structure, and operations of the broadcast receiver according to the second embodiment of the present invention will be described in detail.

FIG. 8 shows a syntax structure of a PMT including 3D broadcast information according to one embodiment of the present invention.

Referring to FIG. 8, the PMT includes 3DTV information, a stream type, 3DTV ES information and the like, that are used as 3D broadcast information, as a descriptor or a field type. The PMT syntax structure of FIG. 8 is similar to the PMT syntax structure of FIG. 3, and as such a detailed description thereof will herein be omitted. Detailed description of fields contained in the PMT of FIG. 8 is as follows.

The 'descriptor' field 8010 includes 3DTV information (or 3DTV_descriptor), and a detailed description of the 3DTV information will hereinafter be described in detail.

A 'stream_type' field (8020) is an 8-bit field specifying the type of elementary stream or payload carried within packets with the PID whose value is specified by the 'elementary_PID' field. In addition, the 'stream_type' field may indicate a coding type of a corresponding video element. As an exemplary coding type, a JPEG, an MPEG-2, an MPEG-4, an H.264/AVC, an H.264/SVC or H.264/MVC scheme may be used. In addition, the stream_type field 8020 may have a specific field value that is interpreted as private data in the 2D broadcast receiver. For example, in regard to a video stream or an audio stream contained in a 3D corresponding program, a field value of a stream_type field 8020 is set to 0x06, such that the legacy 2D broadcast receiver may discard or bypass corresponding streams.

The descriptor field 8030 includes 3DTV format information (or 3DTV_format_descriptor), and the 3DTV format information will hereinafter be described in detail.

FIG. 9 shows a syntax structure of 3DTV information contained in a PMT according to one embodiment of the present invention.

Detailed descriptions of the fields shown in FIG. 9 are equal to those of 3DTV information fields. In accordance with the second embodiment of the present invention, the stereoscopic image format has been disclosed as an example, such that the number_of_total_views field may be omitted. However, the above-mentioned example is disclosed for only illustrative purposes. In the case of transmitting a multi-view image, the syntax structure of FIG. 9 may include the number_of_total_views field. In this case, the number_of_total_views field has already been disclosed in FIG. 4.

FIG. 10 shows a syntax structure of 3D format information contained in a PMT according to one embodiment of the present invention.

Detailed descriptions of the fields contained in the 3D format information of FIG. 10 are as follows.

The 3D_ES_stream_type field indicates category information of a video ES and codec information. For example, the 3D_ES_stream_type field may use values defined in Table 2-34 of ISO/IEC 13818 1 (MPEG-2 Systems).

Fields to be described in the following may be omitted or discarded when the 3D_ES_stream_type field of the 3D_format_descriptor field corresponds to an audio stream (that is, the above fields are present only in the video ES).

The composition type field indicates how the left/right images of the stereo-multiplexed video data are multiplexed. In other words, the broadcast receiver parses a value of the composition_type field, and the composition type field determines which format among several formats (i.e., a side-by-side format, a top-bottom format, an interlaced format, a frame sequential format, a checkerboard format, an anaglyph format, a full left/right format, a full left/half right format, and a 2D video/depth format) was used for reception of the corresponding 3D image.

When a stereoscopic image is configured (or multiplexed), the LR_first_flag field indicates whether the upper leftmost pixel of the frame belongs to a left image or a right image. For example, if the LR_first_flag field has a value of zero, this means that a pixel belonging to the left image is located prior to the right image.

The spatial_flipping_flag field indicates whether at least one of the right and left images is scanned and coded in an inverse direction.

The image0_flipped_flag field of 1 indicates which one of images is flipped or mirror-inverted. If an image (image0) is flipped, the image0_flipped_flag field is denoted by '1'. If another image (image 1) is flipped, the image0_flipped_flag field is denoted by '0'. For example, the image0 includes the upper leftmost pixel of one frame composed of left and right images, and the image1 is a different image. In other words, the image0 or the image1 may be mapped to a left image or a right image according to information of the LR_first_flag field. If the LR_first_flag field is set to '0', this means a left image. If the LR_first_flag field is set to '1', this means a right image.

The quincunx_filtering_flag field may indicate whether the sampling was performed using the quincunx filter when a left image or a right image is sampled at a half resolution. For example, if the quincunx filtering was performed, the quincunx_filtering_flag field may be denoted by '1'. Otherwise, the quincunx_filtering_flag field may be denoted by '0'. If the quincunx_filtering_flag field is set to 1, the reception system may perform inverse processing of the quincunx filtering of the corresponding image.

When receiving the PMT according to the second embodiment, operations of the broadcast receiver may be operated as follows.

(1) Operations of 2D Broadcast Receiver

The 2D broadcast receiver extracts a PMT from SI information contained in a broadcast signal, and parses the extracted PMT. In this case, the stream_type_information contained in the PMT is checked. If the stream_type information is set to 0x06, the broadcast receiver determines a corresponding stream to be private data, the corresponding stream is considered to be a service incapable of being processed in the 2D broadcast receiver, so that the corresponding program is ignored or discarded. All ESs constructing the 3D program are interpreted as private data, such that the 2D broadcast receiver ignores a corresponding program and prevents the occurrence of programs (e.g., an image in which a left view image and a right view image are mixed is output, or only audio streams are output on the condition that video data is ignored or discarded) caused by faulty operations generated when elements of the 3D program are processed.

(2) Operations of 3D Broadcast Receiver—Viewing of 3D Broadcast Service

The 3D broadcast receiver extracts a PMT from SI information contained in a broadcast signal, and parses the extracted PMT. The 3D broadcast receiver checks the stream_type information of each ES constructing the program. If the stream_type information is set to 0x06 and 3DTV information is present in the PMT, or if 3DTV ES information is present in each ES loop, it is determined that the corresponding program corresponds to a 3DTV service. In this case, the stream type field of each ES constructing the 3D program should be set to 0x06. This stream_type field of 0x06 is applied not only to a video ES and an audio ES, but also to a data broadcast stream associated with a corresponding program.

Information of a real codec or stream type in relation to an ES constructing the corresponding program may be acquired using information of the 3D_ES_stream_type field contained in the 3DTV ES information. The broadcast receiver acquires a video PID value, and acquires 3D format category information of a corresponding video element and left/right arrangement information.

The broadcast receiver processes decoded stereo-multiplexed video elements using the output formatter, and outputs the processed video elements. The output formatter may perform additional resizing, frame rate conversion, and the like using not only 3D format category information acquired from the 3DTV format information but also left/right arrangement information.

(3) Operations of 3D Broadcast Receiver—Conversion to 2D Mode

The broadcast receiver reads the corresponding_2D_program_number field from 3DTV information, and recognizes a 2D program described in the corresponding_2D_program_number field. Thereafter, the broadcast receiver extracts a PMT associated with a program number described in the corresponding_2D_program_number field, and parses the extracted PMT, such that it acquires information of video and audio elements of a corresponding program. The broadcast receiver interworks with a VCT or the like during a process for acquiring channel information, such that it can further acquire logical channel information.

The broadcast receiver performs program switching (or channel switching), decodes video and audio elements of a 2D program corresponding to the converted program, and outputs the decoded result.

FIG. 11 is a block diagram illustrating a broadcast receiver for processing a broadcast signal according to a second embodiment of the present invention.

Referring to FIG. 11, the broadcast receiver includes a receiving unit 11010, a demultiplexer (TP Demux) 11020 for extracting a Transport Packet (TP) or Elementary Stream (ES) from the broadcast signal and outputting the extracted TP or ES, a system information (SI) processor 11030 for parsing system information, and a video processing unit 11040 for processing a video element. The receiving unit 11010 may further include a Tuner & Demodulator 11050 and a Vestigial Side Band (VSB) decoder 11060 according to embodiment categories. The video processing unit 11040 may further include a video decoder 11070 for decoding video data, and an output synchronizer 11080 for synchronizing frames of video data. In addition, although not shown in FIG. 11, the broadcast receiver may further include a controller for controlling the above-mentioned components as necessary. The controller may further perform program switching or channel switching as necessary.

In accordance with the second embodiment of the present invention, an image for a 2D broadcast service and an additional image for a 3D broadcast service may be received as an additional ES. In each image for the 3D broadcast service, a left image and a right image are multiplexed into one frame, and the multiplexed result is transmitted to a destination.

The broadcast receiver of FIG. 11 may be operated in a similar way to the conventional 2D broadcast receiver, except for operations of the system information (SI) processor and the output formatter, i.e., except for an operation for extracting the 3DTV format descriptor by the SI processor and an operation of format conversion by the output formatter.

The embodiments shown in FIGS. 12 and 13 disclose a method for allowing a broadcast receiver to convert a received multiplexing format into another multiplexing format using 3DTV format information, and outputting the converted result.

FIG. 12 is a structural diagram illustrating a broadcast receiver that converts a multiplexing format of a received image into another format using 3D image format information and outputs the converted result according to one embodiment of the present invention.

As can be seen from the left side of FIG. 12, it is possible to recognize the multiplexing format of 3D video data according to the value of the composition_type field. The broadcast receiver parses the system information. If the composition_type field is set to the value of 0, the broadcast receiver can identify the vertically interlaced format. If the composition_type field is set to the value of 1, the broadcast receiver can identify the side-by-side format. If the composition_type field is set to the value of 2, the broadcast receiver can identify the horizontally interlaced format. If the composition_type field is set to the value of 3, the broadcast receiver can identify the vertically interlaced format. If the composition_type field is set to the value of 4, the broadcast receiver can identify the checkerboard format.

A conceptual diagram of the output formatter of the broadcast receiver is illustrated at the right side of FIG. 12. In one embodiment, the output formatter of the broadcast receiver may include a scaler 12010, a reshaper 12020, a memory (DDR) 12030, and a formatter 12040.

The scaler 12010 performs resizing and interpolation of the received image. For example, the scaler 12010 may perform resizing and quincunx reverse-sampling of the received image according to the received image format and the output image format. During resizing, the received image may be resized with various rates (e.g., 1/2 resizing, doubling (2/1 resizing)) according to the resolution and the image size. The reshaper 12020 extracts the left/right images from the received image and stores the extracted left/right images in the memory 12030, or extracts the read image from the memory 12030. If a map of one image stored in the memory 12030 is different from that of an output image, the reshaper 12020 reads the image stored in the memory and maps the read image to the output image. The memory 12030 stores the received image, or buffers the received image and outputs the buffered image result. The formatter 12040 performs conversion of an image format according to the format of an image to be displayed. For example, the formatter 12040 may convert the top-bottom format image into the interlaced format.

FIG. 13 is a conceptual diagram illustrating a video data processing method of a broadcast receiver that converts a multiplexing format of a received image using 3DTV format information and outputs the converted result according to one embodiment of the present invention.

1) First, the first embodiment of the present invention discloses that an output format corresponds to a horizontally-interleaving operation, and a detailed description thereof will hereinafter be described.

The scaler performs vertical- or horizontal—1/2 resizing of the received left or right image, and outputs the resized result. The reshaper stores the output image in the memory, performs image scanning using the top-bottom format, and outputs the scanned result. The scaler performs horizontal 2/1 resizing of the received top-bottom format image, and the formatter converts the received full-screen top-bottom format image into the horizontally interlaced format and outputs the conversion result.

2) Next, the second embodiment of the present invention discloses that a multiplexing format of the received 3D image is a side-by-side format and an output format corresponds to a horizontally-interleaving mode. It is assumed that the received 3D image indicates left first and no flipping.

The scaler performs vertical 1/2 resizing of the received side-by-side format image, and outputs the resized result. The reshaper stores the output image in the memory, performs image scanning using the top-bottom format, and outputs the scanned result. The scaler performs horizontal 2/1 resizing of the received top-bottom format image, and the formatter converts the received full-screen top-bottom format image into the horizontally interlaced format and outputs the conversion result.

Figure 14:
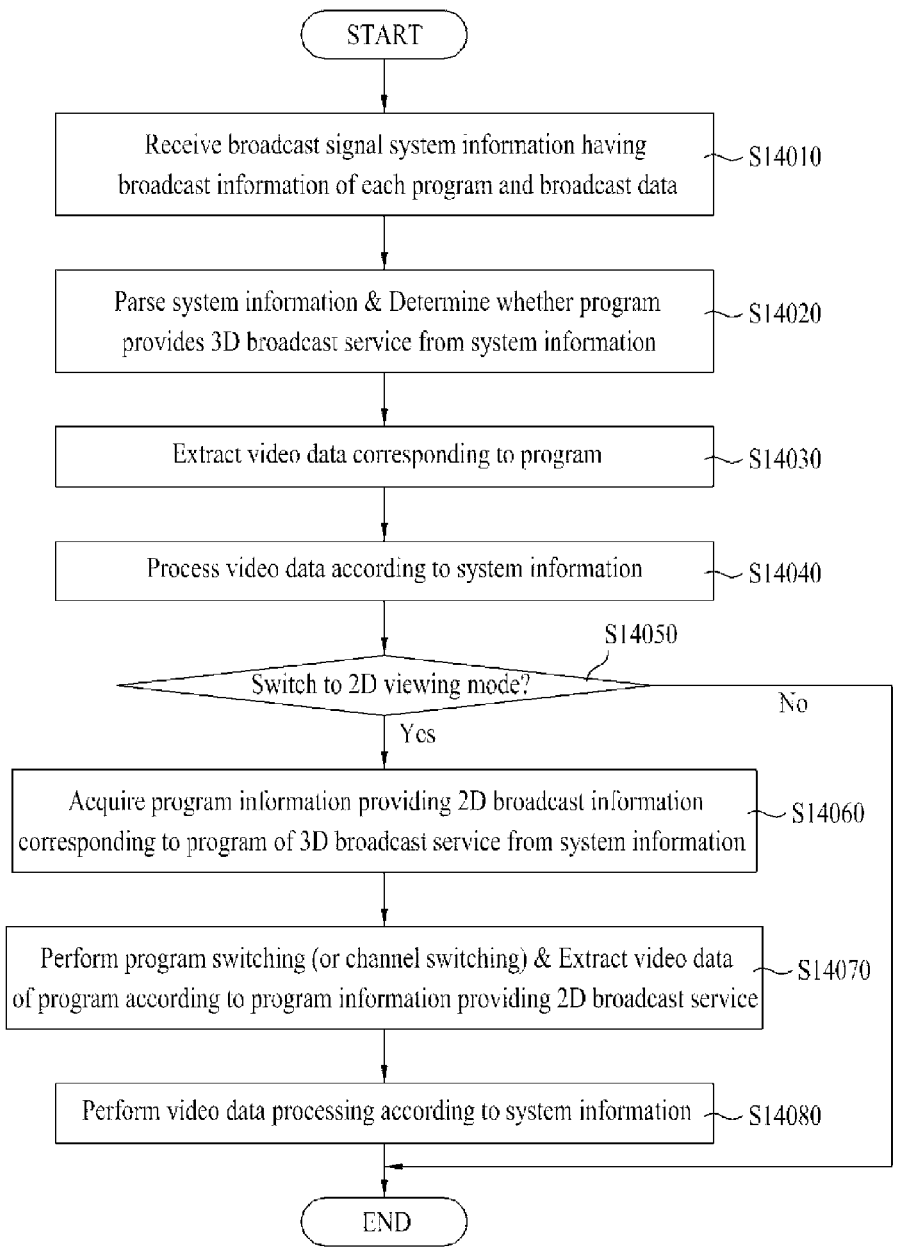
FIG. 14 is a flowchart illustrating a broadcast data processing method of a 3D broadcast receiver according to one embodiment of the present invention.

FIG. 14 is a flowchart illustrating a broadcast data processing method of a 3D broadcast receiver according to one embodiment of the present invention.

Referring to FIG. 14, the broadcast receiver allows the receiving unit to receive a broadcast signal that includes not only system information having broadcast information of each program but also broadcast data (or video data) at step 14010. For example, the system information may correspond to the ATSC standard PSI, and broadcast information of each program may correspond to PMT information. A broadcast signal or broadcast data may include video data, audio data, and additional data that correspond to a program. The following will be described on the basis of video data. The video data may represent video data that includes a video stream, an ES, a frame and an image.

The broadcast receiver parses system information using the System Information (SI) processor, and determines whether or not the program provides a 3D broadcast service by referring to the system information at step 14020. For example, the broadcast receiver determines whether or not the program provides a 3D broadcast service by detecting at least one of the presence or absence of stream_type information of each ES configuring a program in the PMT, the presence or absence of 3DTV information, and the presence or absence of 3DTV ES information contained in each ES loop. In other words, broadcast receiver parses the system information and determines whether the video data of specific program means the 3D broadcast service on the basis of the system information.

The broadcast receiver extracts broadcast data (or video data) corresponding to the program providing the 3D broadcast service using the demultiplexer at step S 14030. For example, the broadcast receiver can extract video data using PIDs of a program that provides the 3D broadcast service through the PMT.

The broadcast receiver processes the extracted video data using the video processing unit at step S 14040. The operation for processing video data may include a decoding operation of the video decoder, a synchronization operation of the synchronizer, and an image formatting operation of the output formatter, etc. For example, the broadcast receiver acquires 3DTV information, 3DTV ES information, and 3DTV format information by parsing the PMT, and can process video data using at least one of the acquired information.

The broadcast receiver may switch a 3D viewing mode to a 2D viewing mode upon receiving an input signal from the user at step 14050.

In this case, the broadcast receiver may acquire program information of a 2D program, that provides a 2D broadcast service of a specific program capable of providing a 3D broadcast service from the system information, using the SI processor at step S 14060. For example, the program information may include a program number of a 2D program corresponding to a 3D program (e.g., corresponding_ 2D_program_number information).

The broadcast receiver performs program conversion (or change), and extracts video data of a 2D program according to program information of the 2D program using the demultiplexer at step S 14070. For example, the broadcast receiver may convert (or switch) a program number into a number of a 2D program, and may perform channel conversion by mapping a channel number of a VCT contained in system information to a program number, such that it may extract video data of either a corresponding program or a channel. The broadcast receiver may acquires channel information of the program using a Terrestrial Virtual Channel Table (TVCT) contained in the system information by controlling the SI processor, and switches a channel to another channel using the channel information, by the controller.

The broadcast receiver may process video data of the 2D program at step S14080.

The video data processing of the broadcast receiver may decode video data, and also include video formatting disclosed in FIGS. 12 and 13.

The broadcast receiver may perform conversion of either a program or a channel using the controller. In other words, if a current viewing mode is converted into a 2D viewing mode, the broadcast receiver controls components contained in the broadcast receiver according to the received viewing mode conversion input signal, such that it can perform the above-mentioned operations.

Individual steps associated with FIG. 14 relate to the embodiments disclosed in

FIGS. 1 to 13, and as such a detailed description thereof will herein be omitted.

The method disclosed in the present invention may be implemented in the form of program commands executable by a variety of computer means, and recorded on a computer-readable recording medium. The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language code that may be executed by a computer using an interpreter, etc., as well as machine language code such as those produced by a compiler. The above-stated hardware devices may be configured to operate as one or more software modules to perform the operation of the present invention, and vice versa.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

Mode for the Invention

Various embodiments have been described in the best mode for carrying out the invention.

Industrial Applicability

As apparent from the above description, embodiments of the present invention may be wholly or partially applied to a digital broadcasting system.

According to embodiments of the present invention, the broadcast receiver can process 3D video data such that a 3D effect intended by a 3D broadcast service provider is reflected in the 3D broadcast service.

In addition, the embodiments of the present invention can effectively provide a 3D broadcast service simultaneously while minimizing the effect on a conventional 2D broadcast service.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A three dimensional (3D) video data processing method for use in a broadcast receiver, the method comprising:
    receiving, by a receiving unit, a broadcast signal including system information and video data of a program;
    parsing, by a system information (SI) processor, the system information of the program, and determining whether the video data of the program provides a 3D broadcast service based on the system information;
    extracting, by a demultiplexer, the video data of the program when the video data of the program provides the 3D broadcast service; and
    processing, by a video processing unit, the video data of the program according to the system information,
    wherein the system information includes a spatial flipping flag field indicating whether at least one of the right and left images is scanned and coded in an inverse direction.

2. The 3D video data processing method according to claim 1,
    wherein the system information, when the video data of the program provides the 3D broadcast service, includes a corresponding 2D program number field indicating information of a 2D program providing a 2D broadcast service corresponding to the program.

3. The 3D video data processing method according to claim 2, further comprising:
    when a current viewing mode is changed from a 3D viewing mode to a 2D viewing mode,
    acquiring, by the SI processor, the information of the 2D program providing the 2D broadcast service corresponding to the program from the corresponding 2D program number field;
    switching, by a controller, the program into the 2D program using the information of the 2D program, and extracting, by the demultiplexer, video data of the 2D program; and processing, by the video processing unit, the video data of the 2D program.

4. The 3D video data processing method according to claim 3, wherein the switching the program further comprises changing a number of the program to a number of the 2D program.

5. The 3D video data processing method according to claim 1, wherein the system information includes a Program Map Table (PMT).

6. The 3D video data processing method according to claim 1, wherein the video data of the program meaning the 3D broadcast service is assigned a stream type value that is different from video data meaning a 2D broadcast service.

7. The 3D video data processing method according to claim 3, wherein the switching of the program into the 2D program further includes:
    acquiring, by the controller, channel information of the program and the 2D program using a Terrestrial Virtual Channel Table (TVCT) contained in the system information; and
    switching a channel to another channel using the channel information.

8. A broadcast receiver comprising:
    a receiving unit for receiving a broadcast signal including system information and video data of a program;
    a system information (SI) processor for parsing the system information of the program, and determining whether the video data of the program provides a 3D broadcast service based on the system information;
    a demultiplexer for extracting the video data of the program when the video data of the program provides the 3D broadcast service; and
    a video processing unit for processing the 3D video data of the program according to the system information,
    wherein the system information includes a spatial flipping flag field indicating whether at least one of the right and left images is scanned and coded in an inverse direction.

9. The broadcast receiver according to claim 8, wherein the system information, when the video data of the program provides the 3D broadcast service, includes a corresponding 2D program number field indicating information of a 2D program providing a 2D broadcast service corresponding to the program.

10. The broadcast receiver according to claim 9, wherein:
    when a current viewing mode is changed from a 3D viewing mode to a 2D viewing mode,
    the SI processor acquires the information of the 2D program providing the 2D broadcast service corresponding to the program from the corresponding 2D program number field,
    the demultiplexer extracts video data of the 2D program,
    the video processing unit performs processing of the video data of the 2D program, and
    the broadcast receiver further includes a controller for switching the program into the 2D program using the information of the 2D program.

11. The broadcast receiver according to claim 10, wherein the switching the program further comprises changing a number of the program to a number of the 2D program.

12. The broadcast receiver according to claim 8, wherein the system information includes a Program Map Table (PMT).

13. The broadcast receiver according to claim 8, wherein the video data of the program meaning the 3D broadcast service is assigned a stream type value that is different from video data meaning a 2D broadcast service.

14. The broadcast receiver according to claim 10, wherein the controller further acquires channel information of the program and the 2D program using a Terrestrial Virtual Channel Table (TVCT) contained in the system information by controlling the SI processor, and switches a channel to another channel using the channel information.

* * * * *